United States Patent [19]
Yamamoto

[11] Patent Number: 6,111,882
[45] Date of Patent: Aug. 29, 2000

[54] ON-DEMAND SYSTEM

[75] Inventor: Kunio Yamamoto, Kawasaki, Japan

[73] Assignee: Fujitsu Limited, Kanagawa, Japan

[21] Appl. No.: 08/824,314

[22] Filed: Mar. 26, 1997

[30] Foreign Application Priority Data

Aug. 22, 1996 [JP] Japan ................................. 8-221137

[51] Int. Cl.[7] ............................................... H04L 12/50
[52] U.S. Cl. ............................ 370/399; 370/420; 347/7
[58] Field of Search ................................ 270/401, 410,
270/398, 399, 392, 395, 420, 486, 389,
396, 397, 400, 377; 348/7, 6, 10, 12, 13;
379/229, 234, 242, 245, 280; 455/2–5.1;
709/226, 250

[56] References Cited

U.S. PATENT DOCUMENTS

| | | | |
|---|---|---|---|
| 5,627,836 | 5/1997 | Conoscenti et al. | 370/397 |
| 5,631,903 | 5/1997 | Dianda et al. | 370/401 |
| 5,771,231 | 6/1998 | Watanabe | 370/399 |
| 5,892,912 | 4/1999 | Suzuki et al. | 709/218 |

FOREIGN PATENT DOCUMENTS 8-8931  1/1996  Japan .

*Primary Examiner*—Seema S. Rao
*Attorney, Agent, or Firm*—Melfgott & Karas, P.C.

[57] ABSTRACT

An on-demand system controlling on-demand services between a media server and subscriber terminals, the system includes an ATM-HUB unit which performs a path setting operation in accordance with a PVC (Permanent Virtual Connection) function, and a path setting management server. The ATM-HUB unit has previously set paths between the subscriber terminals and the path setting management server and between a controller of the ATM-HUB unit and the path setting management server in accordance with the PVC function at a time of setting environments of the system. A subscriber terminal supplying a media transmission request to the path setting management server via the path set between the subscriber terminal and the path setting management server. The path setting management server requests the controller of the ATM-HUB unit to set a path between the subscriber terminal and the media server via the path set between the path setting management server and the controller of the ATM-HUB unit in response to the media transmission request from the subscriber terminal. The ATM-HUB unit sets, based on an instruction from the controller, a path between the subscriber terminal and the media terminal in accordance with the PVC function.

13 Claims, 21 Drawing Sheets

FIG.10A

| FRAME SIGNAL (01111110) |
|---|
| ADDRESS INFORMATION |
| CONTROL INFORMATION |
| INFORMATION ELEMENT |
| FCS |
| FRAME SIGNAL (01111110) |

FIG.10B

| INFORMATION ELEMENT | |
|---|---|
| STB → MANAGEMENT SERVER | MANAGEMENT SERVER → STB |
| VIDEO STB ID | VIDEO STB ID |
| VIDEO REQUEST/PROGRAM DISPLAY REQUEST | REQUEST VIDEO CHANNEL |
| REQUEST VIDEO CHANNEL | PERMISSION/DENIAL |
| VIDEO INTERRUPTION REQUEST | REQUEST CHANNEL IDLE/BUSY |
| | WAITING TIME IN BUSY STATE |
| | TELEVISING START/DISCONNECTION (REASONS) |
| | PROGRAM LIST |

FIG. 11

| INFORMATION ELEMENT | | |
|---|---|---|
| | MANAGEMENT SERVER→ATM-HUB | ATM HUB→MANAGEMENT SERVER |
| LIN CONTROL REQUEST/PATH CONNECTION STATE CONFIRMATION | | CONNECTION COMPLETION/DENIAL (REASONS) |
| CONNECTING REQUEST/ DISCONNECTION REQUEST | | PATH CONNECTION STATE LIST |
| VPCI/VCI VALUE (SOURCE) | | VPCI/VCI VALUE (SOURCE) ATM-HUB PORT NO. (SOURCE) |
| ATM-HUB PORT NO. (SOURCE) | | VPC/VCI VALUE (DESTINATION) ATM-HUB PORT NO. (DESTINATION) |
| VPCI/VCI VALUE (DESTINATION) | | LINE DISCONNECTION INFORMATION (DISCONNECTED PORT/REASONS) |
| ATM-HUB PORT NO. (DESTINATION) | | BODY (ATM-HUB) RESTART INFORMATION |
| QoS PARAMETER/REQUEST BAND WIDTH | | |

FIG.14

| TERMINAL ID | TYPE (STB/SERVER) | ATM HUB PORT NO. | | | | |
| --- | --- | --- | --- | --- | --- | --- |
| | | SHELF NO. | CARD NO. | CIRCUIT NO. | VPI VALUE | VCI VALUE |
| xxxxxx | STB | xx | xx | x | xxx | xxxxx |
| ------ | ------ | ------ | ------ | ------ | ------ | ------ |
| xxxxxx | VIDEO SERVER ch1 | xx | xx | x | xxx | xxxxx |
| --- | --- | --- | --- | --- | --- | --- |

FIG. 15

| TERMINAL ID | TYPE | IDLE/BUSY | CONNECTION TERMINAL ID | TELEVISING PROGRAM ID | CONNECTING START TIME | RELEACING EXPECTED TIME |
|---|---|---|---|---|---|---|
| xxxxxx | STB | IDLE | — | — | — | — |
| ---- | ---- | ---- | ---- | ---- | ---- | ---- |
| xxxxxx | VIDEO SERVER Ch-1 | BUSY | xxxxxx | xxx | xx-xx-xx | xx-xx-xx |
| --- | --- | --- | --- | --- | --- | --- |

FIG. 16

| TELEVISING PROGRAM ID | TITLE | DIRECTOR | LEADING ACTOR/ACTRESS | CONTENTS | TELEVISING PERIOD | PRICE |
|---|---|---|---|---|---|---|
| xxx | xxxxxxx | xxxx | xxxx | xxxxxxxxxxxxxxxxxxxxxx | xx-xx | xxxxx |
| ------ | ------ | ------- | ------- | ------- | ------- | -------- |

FIG. 17

| TERMINAL ID | TELEVISING PROGRAM ID | TELEVISING START TIME | TELEVISING TERMINATION TIME | PRICE | CHARGE | PAYMENT |
|---|---|---|---|---|---|---|
| ----- | ----- | ----- | ----- | ----- | ----- | ----- |

ON-DEMAND SYSTEM

BACKGROUND OF THE INVENTION

(1) Field of the Invention

The present invention relates to an on-demand system, such as a VOD (Video On-Demand) system, by which information and services can be utilized immediately after requesting the information and/or services.

(2) Description of the Related Art

A VOD system which is a type of on-demand system is formed as shown in FIG. 1. As shown in FIG. 1, an ATM-SW unit (ATM switching unit) is connected with a video server and a plurality of video STB terminals. The video server stores video information items of various video programs. In response to a selecting request of a video program from a subscriber, the video server supplies a video information item corresponding to the requested video program to the subscriber. The video information items are generally compressed, for example, in accordance with a specification of the MPEG-2. Each of the STB (Set Top Box) terminals is a transmitter-receiver terminal unit which is mounted on a television unit of a subscriber. Each of the STB terminals transmits control signals, such as a signal for requesting to televise a video program, to the video server and decodes the video information received from the video server. The ATM-SW unit has a SVC (Switched Virtual Connection) function as a dynamic routing so that a path can be set between a calling terminal and a called terminal in accordance with a dialing operation of a subscriber. The service of the dynamic switching function has to be usually supplied by a switching unit having a grade not less than a grade of the ATM edge switching unit.

In the VOD system, in response to a selecting request of a video program from a subscriber (a STB terminal), the ATM-SW unit has to connect the video server and the STB terminal. In this case, a subscriber dials the video server in which a program favorite with the subscriber is stored so that the STB terminal of the subscriber carries out a calling process. The ATM-SW unit sets a path between the STB terminal of the subscriber and the called video server so as to connect them to each other. If the video server accepts the selecting request of the video program, the video server transmits the video information corresponding to the video program. As has been described above, in the conventional VOD system, it is necessary to provide the ATM-SW unit having a dial-up-signaling function (the SVC function).

The ATM-SW unit is expensive, so that the production cost of the on-demand system using the ATM-SW unit as has been described above is high. Thus, it is preferable that the STB terminals and the video server are connected using a connection unit which is cheaper than the ATM-SW unit so that the on-demand system can be constructed at a lower cost.

An ATM-HUB unit is known as the connection unit for the ATM. As shown in FIG. 2, the ATM-HUB unit is often used in a star connection formation as the backbone of the communication between LANs via LAN units. In many cases, the ATM-HUB unit has only a PVC (Permanent Virtual Connection) function based on input commands, but does not have the SVC function as the dynamic routing. Thus, in general, the ATM-HUB unit can not be applied to services, such as a VOD service and a video telephone service, which needs the dynamic routing function of a switching unit. There is a type of ATM-HUB unit which partially has the switching function. However, the switching function is not sufficient to supply the on-demand service.

SUMMARY OF THE INVENTION

Accordingly, a general object of the present invention is to provide a novel an useful on-demand system in which the disadvantages of the aforementioned prior art are eliminated.

A specific object of the present invention is to provide an on-demand system using the ATM-HUB unit.

The above objects of the present invention are achieved by an on-demand system controlling on-demand services between a media server and subscriber terminals, the system comprising: an ATM-HUB unit which performs a path setting operation in accordance with a PVC (Permanent Virtual Connection) function; and a path setting management server, wherein the ATM-HUB unit has previously set paths between the subscriber terminals and the path setting management server and between a controller of the ATM-HUB unit and the path setting management server in accordance with the PVC function at a time of setting environments of the system, a subscriber terminal supplying a media transmission request to the path setting management server via the path set between the subscriber terminal and the path setting management server, and wherein the path setting management server requesting the controller of the ATM-HUB unit to set a path between the subscriber terminal and the media server via the path set between the path setting management server and the controller of the ATM-HUB unit in response to the media transmission request from the subscriber terminal, and wherein the ATM-HUB unit sets, based on an instruction from the controller, a path between the subscriber terminal and the media terminal in accordance with the PVC function.

According to the present invention, the on-demand services can be supplied to the subscriber using the ATM-HUB unit either has no SVC function or substantially no SVC function. Thus, an on-demand system which is cheaper than the conventional system having the ATM-SW unit can be provided. Since the command interface used for a general PVC setting function is provided in the ATM-HUB unit, the on-demand system can be formed using each of various types of ATM-HUB units which are commercially available.

BRIEF DESCRIPTION OF THE DRAWINGS

Other objects, features and advantages of the present invention will be apparent from the following description when read in conjunction with the accompanying drawings, in which:

FIGS. 10A and 10B are tables illustrating meanings of signals transmitted between the STB terminal and the path setting management server;

FIG. 11 is a table illustrating meanings of signals transmitted between the path setting management server and the ATM-HUB unit;

FIG. 14 is a reference table illustrating relationships among terminals, HUB ports and VPI/VCI values in the VOD system;

FIG. 15 is a state recognition table illustrating states of terminals in the VOD system;

FIG. 16 is a table illustrating a list of programs;

FIG. 17 is a table illustrating televising results in respective terminals;

DESCRIPTION OF THE PREFERRED EMBODIMENTS

A description will be given, with reference to FIG. 3, of a principle of an on-demand system according to an embodiment of the present invention.

Figure 3:
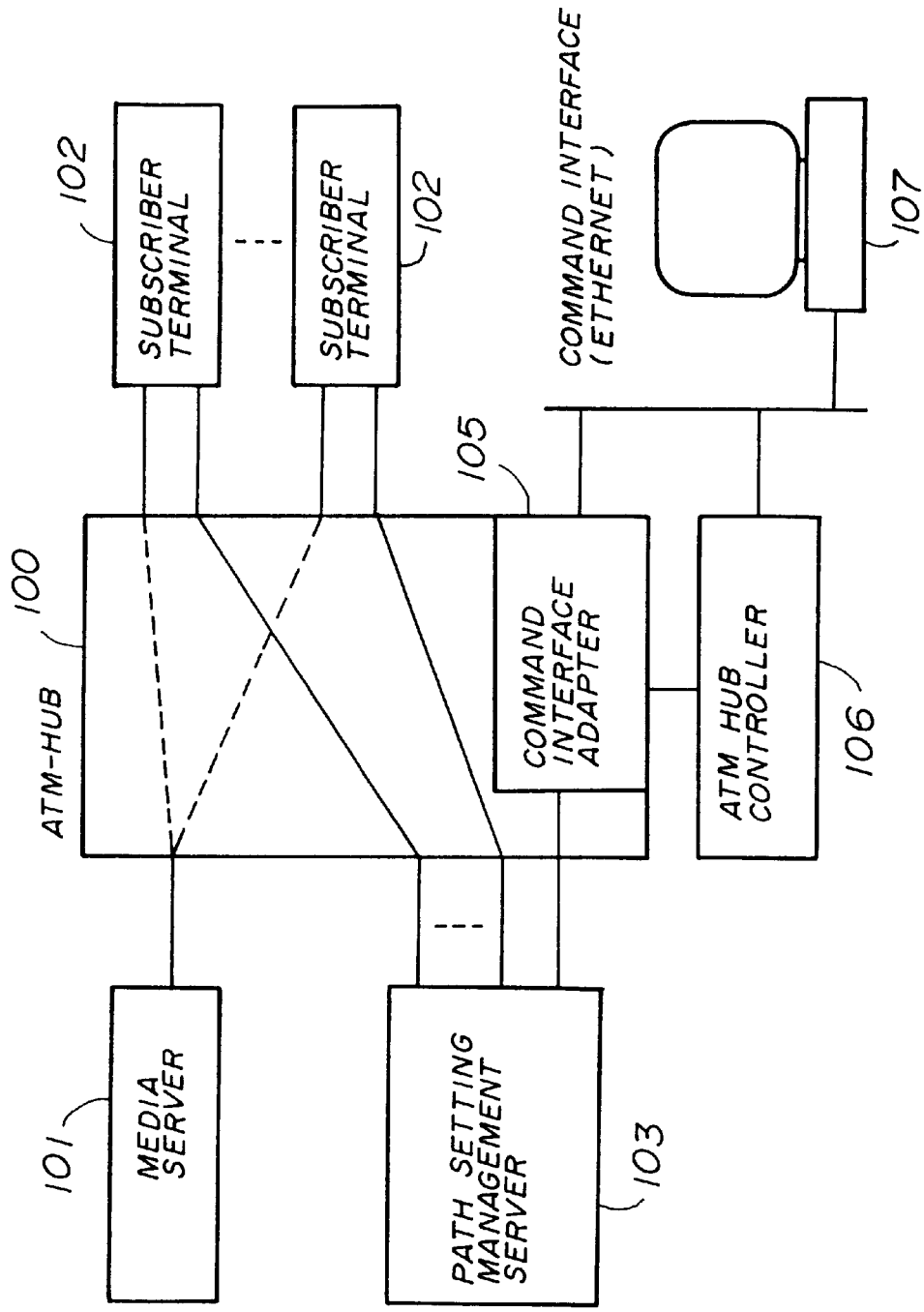
FIG. 3 is a block diagram illustrating a principle of an on-demand system according to an embodiment of the preset invention.

An on-demand system in which paths are dynamically changed using the ATM-HUB unit is formed as shown in FIG. 3.

Referring to FIG. 3, in the on-demand system, there is provided an ATM-HUB unit 100, a media server 101 for supplying media (e.g., the video broadcast), subscriber terminals 102 and a path setting management server 103 for setting paths between the media server 101 and the respective subscriber terminals 102. The ATM-HUB unit 100 has previously set paths between the path setting management server 104 and the respective subscriber terminals 102 in order to specify a channel on demand.

The on-demand system is provided with an ATM-HUB controller 106. The ATM-HUB controller 106 has a command interface for setting paths. The path setting management server 103 and the ATM-HUB controller 106 are connected via an ATM path, a command interface adapter 105 and a command interface. In the case of the ATM-HUB unit 100, a LAN interface such as an Ethernet is often used as the command interface. In this embodiment of the present invention also, the LAN interface is used as the command interface.

A subscriber terminal 102 transmits, to the path setting management server 103, a channel selection request for media required to be transmitted. The path setting management server 103 is connected to the ATM-HUB controller 106 via the command interface adapter 105 and the command interface (the LAN interface) to which an input/output console 107 is connected. The path setting management server 103 requests the ATM-HUB unit 100 to set a path.

After setting the path, the subscriber terminal supplies a media transmission request to the media server 101. In response to the media transmission request, required media is transmitted from the media server 101.

A description will now be given of an embodiment of the preset invention.

Figure 4:
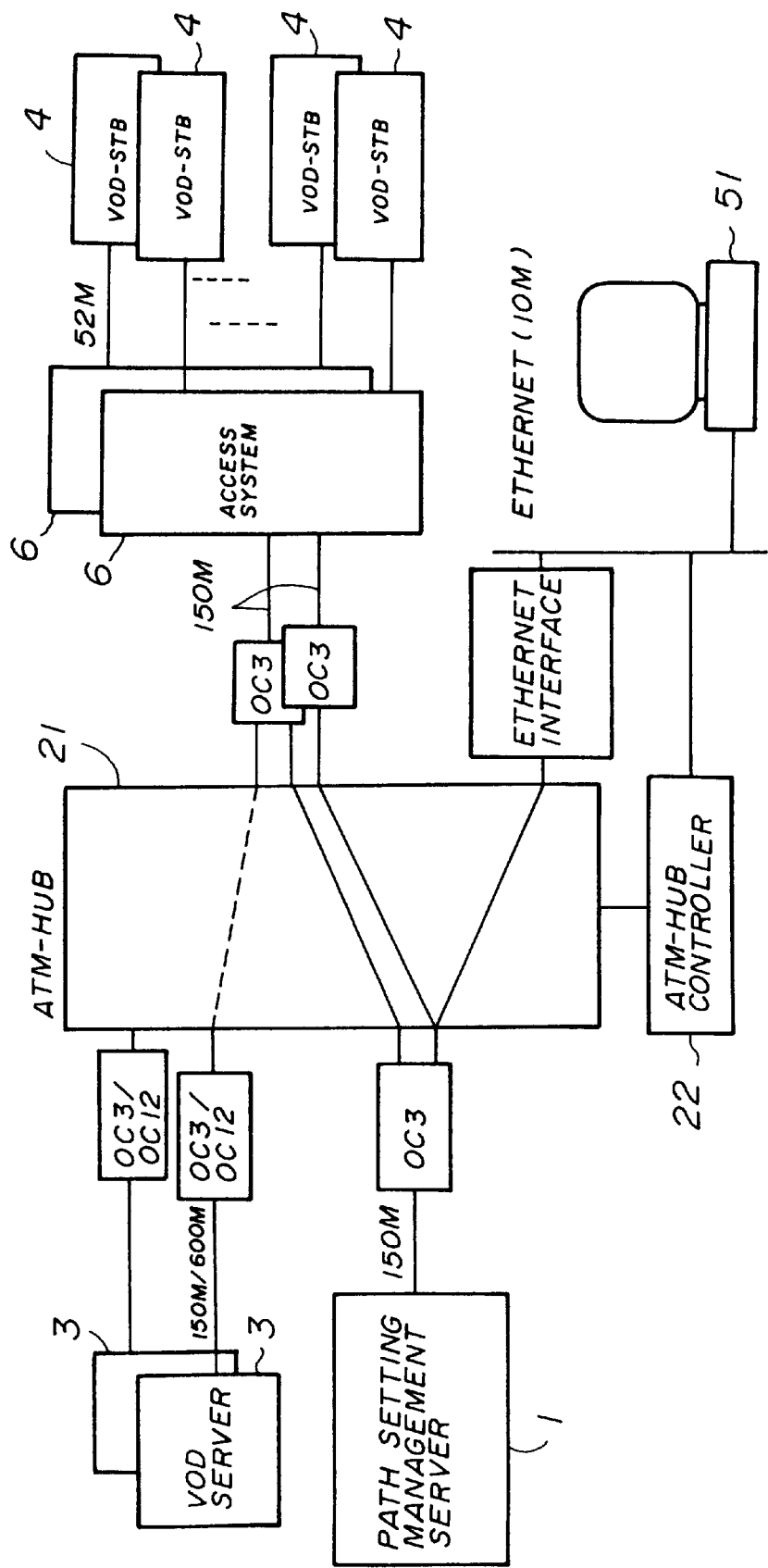
FIG. 4 is a block diagram illustrating the on-demand, system, applied to a VOD system, in a physical layer.
Figure 5:
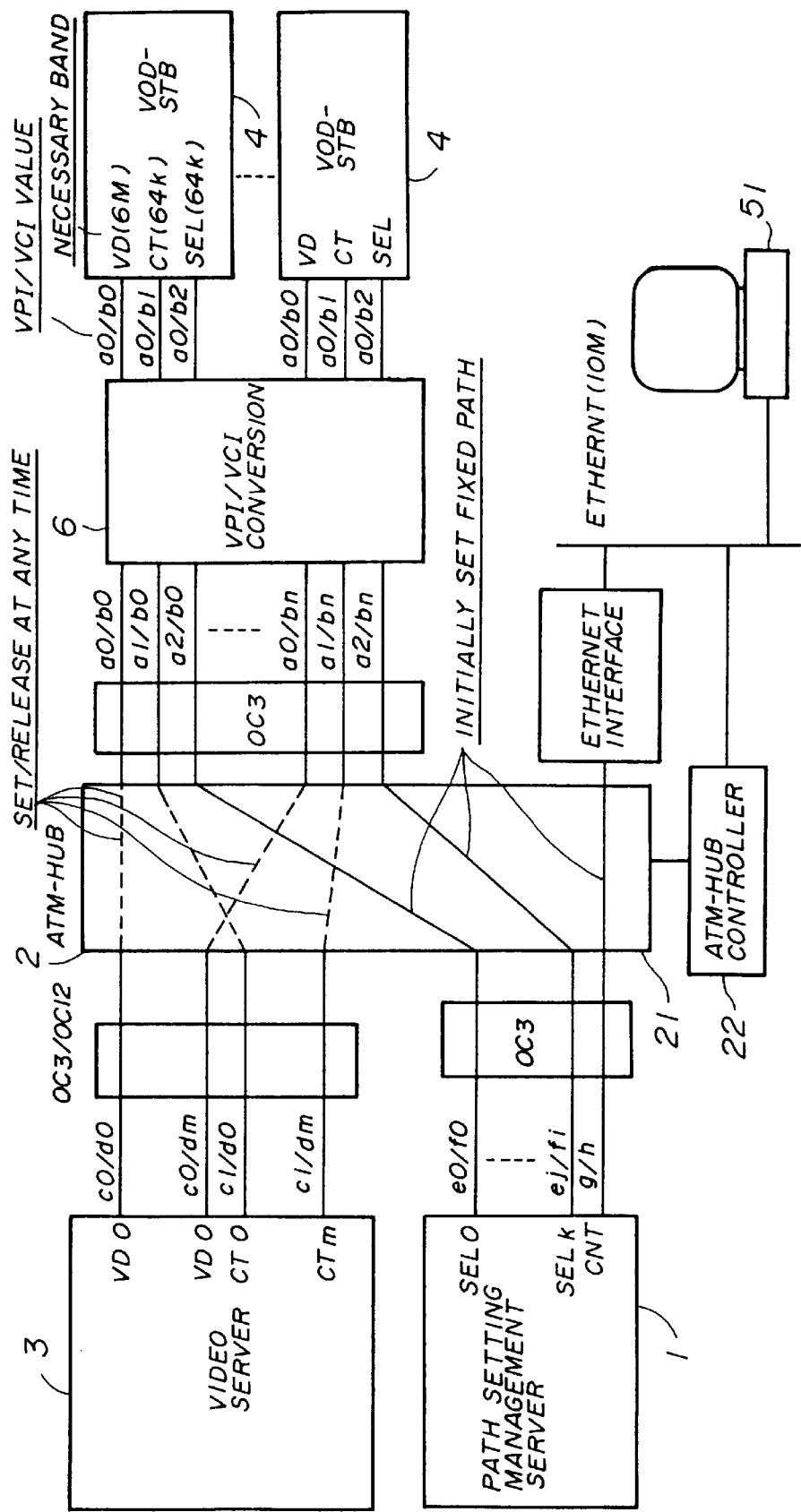
FIG. 5 is a block diagram illustrating the on-demand system, applied to the VOD system, in an ATM layer.

An on-demand system according to the embodiment of the present invention is shown in FIGS. 4 and 5. This on-demand system is applied to the VOD system. FIG. 4 shows a structure of the VOD system using the ATM-HUB in the physical layer, and FIG. 5 shows a structure of the same VOD system in the ATM layer.

Referring to FIG. 4, the ATM-HUB unit 2 includes a switch circuit 21 and an ATM-HUB controller 22. The switch circuit 21 sets paths between input and output user ports using the PVC function. The ATM-HUB controller 22 causes the switch circuit 21 to set the paths in accordance with commands supplied from a terminal console 51. The ATM-HUB controller 22 receives the commands and messages from the terminal console 51 via a man-machine interface. The switch circuit 21 sets the paths based on the commands and the message. An Ethernet interface through which the commands and messages are received from and transmitted to the Ethernet LAN is provided in the system. The system has an RC232C interface through which the commands and messages are received from and transmitted to the single terminal console 51. In addition, in a case where the terminal console 51 is connected to the Ethernet LAN, the ATM-HUB controller can receive the commands and messages from the Ethernet LAN via the Ethernet interface.

The ATM-HUB unit 2 is connected to the Ethernet LAN by an Ethernet adapter. There may be cases where the ATM-HUB unit 2 includes or does not include an Ethernet interface card capable of being directly connected to the Ethernet LAN. In the case where the ATM-HUB unit 2 includes the Ethernet interface card, the card can be directly used as the Ethernet adapter. On the other hand, in the case where the ATM-HUB unit 2 does not include the Ethernet interface card, an ATM interface card which interfaces an ATM line and the Ethernet LAN with each other may be provide outside the ATM-HUB controller 22. In this case, after a user port is temporarily connected to the ATM line (a line of 150 Mbps (OC3) in this embodiment) so that the ATM interface card receives information from the line, the user port can be connected to a PC (a Personal Computer) or a WS (a work station) on the Ethernet LAN.

A path setting management server 1 is connected to the ATM-HUB unit 2 via the line of 150 Mbps (OC3). The path setting management server 1 receives a program request selecting signal from an STB terminal 4 via path which has been previously set in the ATM-HUB unit 2. In response to the program request selecting signal, the path setting management server 1 issues a command for setting a path to the ATM-HUB unit 1. The path setting management server 1 is connected to the Ethernet adapter via a universal user port to connect the ATM-HUB unit 2 to the man-machine interface.

A VOD server (a video server) 3 is connected to the ATM-HUB unit 2 by a line of 150 Mbps/600 Mbps (OC3/OC12). The VOD server 3 stores video information (video information compressed in accordance with the MPEG-2) of various video programs. In response to a program request from the STB terminal 4, the VOD server 3 supplies video information of the video program related to the program request. A plurality of VOD servers may be provided in the system.

Figure 1:
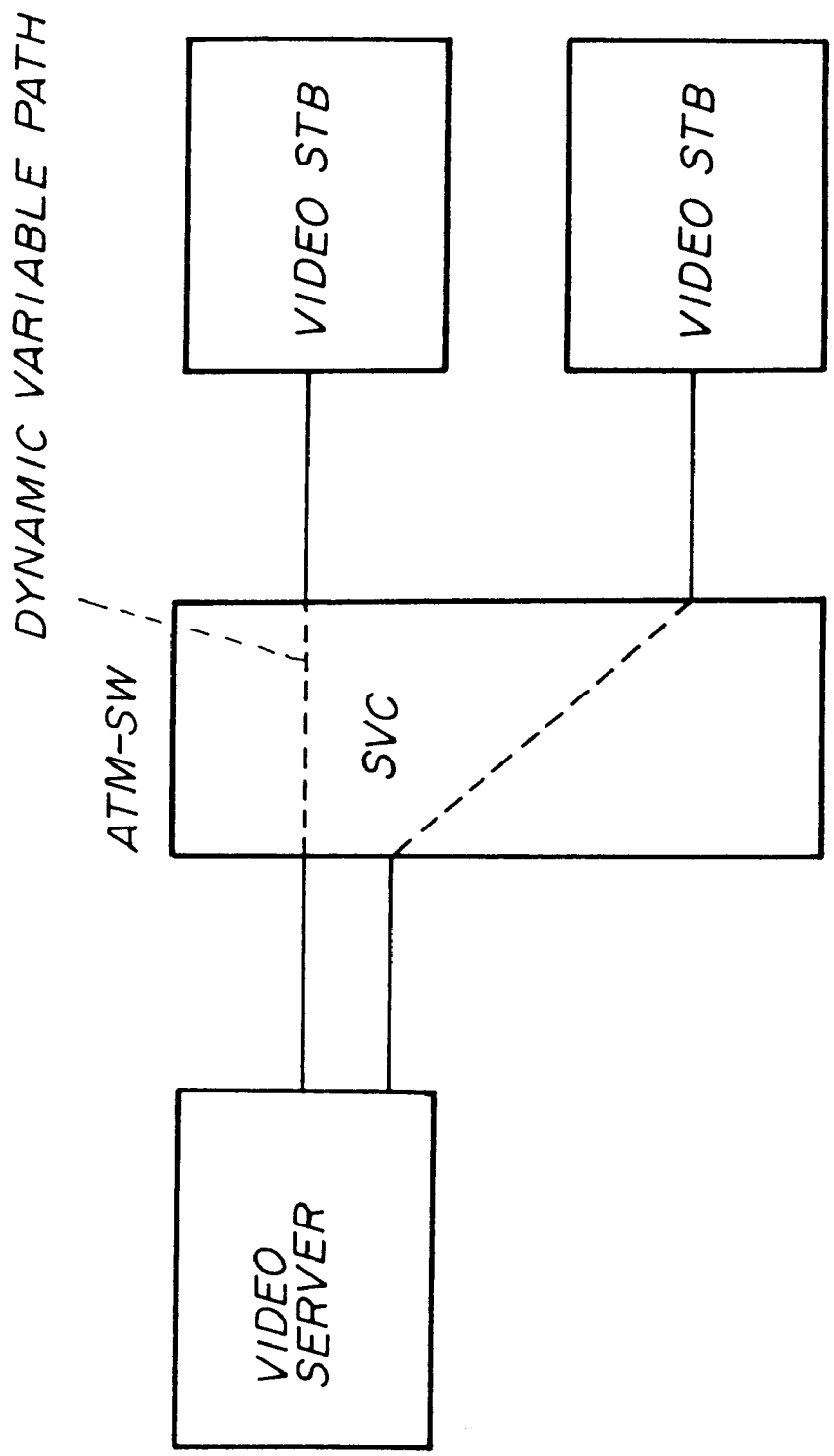
FIG. 1 is a block diagram illustrating a conventional VOD system.
Figure 2:
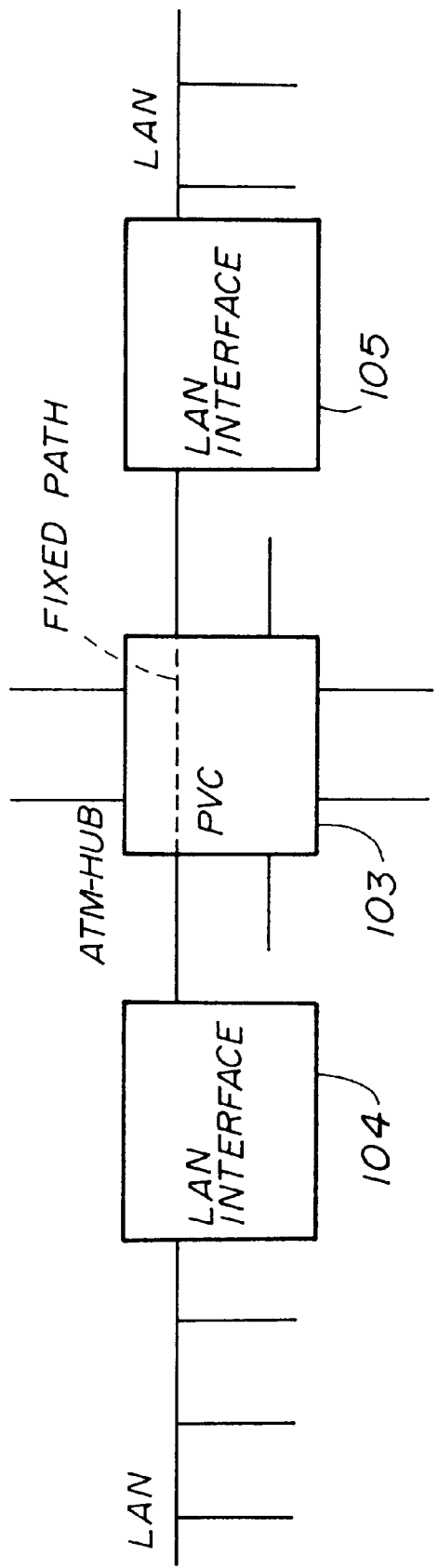
FIG. 2 is a block diagram illustrating a conception of a system using the ATM-HUB.

The STB terminals 4 are provided for respective subscribers of this VOD system. Each of the STB terminals 4 is a transmitter/receiver terminal mounted on a television set of a subscriber. The STB terminals 4 transmits and receives control signals for the request to televise the video program and decodes received video information. This VOD system differs from the conventional VOD system shown in FIG. 1 in that the signaling function (Q. 293.1) is not necessary for each of the STB terminals 4. In the system according to the present invention, since the ATM-SW unit having the dial-up signaling function (the SVC function) is not used, the signaling function is not needed.

An access system 6 is provided between the STB terminals 4 and the ATM-HUB unit 2. The access system 6 is connected to the plurality of STB terminals 4 using lines each of which is a twist-pair wire of hundreds of meters. As a result, a carrier of 52 Mbps can be transmitted between the respective STB terminals 4 and the access system 6 via the lines. Since a bandwidth of 7 Mbps is sufficient to actually transmit video signals, the lines between the access system 6 and the respective STB terminal 4 have sufficient margins. The access system 6 is further connected to ATM-HUB unit 2 by transmission lines (optical transmission lines) of 150 Mbps. The main object of the access system 6 is to concentrate the plurality of low-speed lines between the access system 6 and the respective STB terminals 4 and to replace the low speed lines with the high-speed lines. As a result, the expensive high-speed lines of 150 Mbps are effectively utilized. The access system 6 has a VPI/VCI converting function. Due to the VPI/VCI converting function, the respective STB terminals 4 can be discriminated from each other when the access system 6 relays the low-speed lines concentrated from the respective STB terminals 4 to the high-speed lines.

A structure of the system in the ATM layer is formed as shown in FIG. 5. Referring to FIG. 5, each of the lines of 52 Mbps between the access system 6 and the respective STB terminals 4 includes three kinds of channels:

(a) channels used to receive video signals from the video server 3 (indicated by "VD" in FIG. 5 and having the bandwidth of 6 Mbps);

(b) channels used for a control operation in response to the video transmission request between each of the STB terminals 4 and the video server 3 (indicated by "CT" in FIG. 5 and having a bandwidth of 64 Kbps); and (c) channels for the path setting management server 1 (indicated by "SEL" in FIG. 5 and having the bandwidth of 64 Kbps). A bandwidth of about 7 Mbps may be necessary for these channels.

In a case of an ATM cell transmission from the STB terminals 4 to the ATM-HUB unit 2, to cause the ATM-HUB unit to recognize from which STB terminal the ATM cell is transmitted, the access system 6 converts information of an input port on the STB terminal side into a VPI/VCI value uniquely corresponding to the input port. In contrast with this, ATM cells transmitted from the ATM-HUB unit 2 are divided into the STB terminals by the access system 6 which carries out inversion in accordance with the same principle.

Between the video server 3 and the ATM-HUB unit 2, a plurality of video channels ($VD_0-VD_m$) are provided within a line allowable capacity range. Control channels ($CT_0-CT_m$) respectively corresponding to the video channels ($VD_0-VD_m$) are provided between the video server 3 and the STB terminals 4.

The path setting management server 1 has channels ($SEL_0-SEL_k$) used to select the video server 3 for all the STB terminals $4_0-4_k$. Channels between the path setting management server 1 and the ATM-HUB controller 22 are set in an initial stage of setting the environment of the VOD system. The video channels (VD) and control channels (CT) between the video server 3 and the STB terminals 4 are set and released based on the control of the path setting management server 1 in accordance with requests from the STB terminals.

It is assumed that the Ethernet has a MAC address (Media Access Control address) of the ATM-HUB unit 2. As a result, information from the path setting management server 1 can be relayed to the ATM-HUB controller 22 via the Ethernet.

A description will now be given of detailed structures of the path setting management server 1, the ATM-HUB unit 2, the video server 3 and each of the STB terminals 4.

Figure 6:
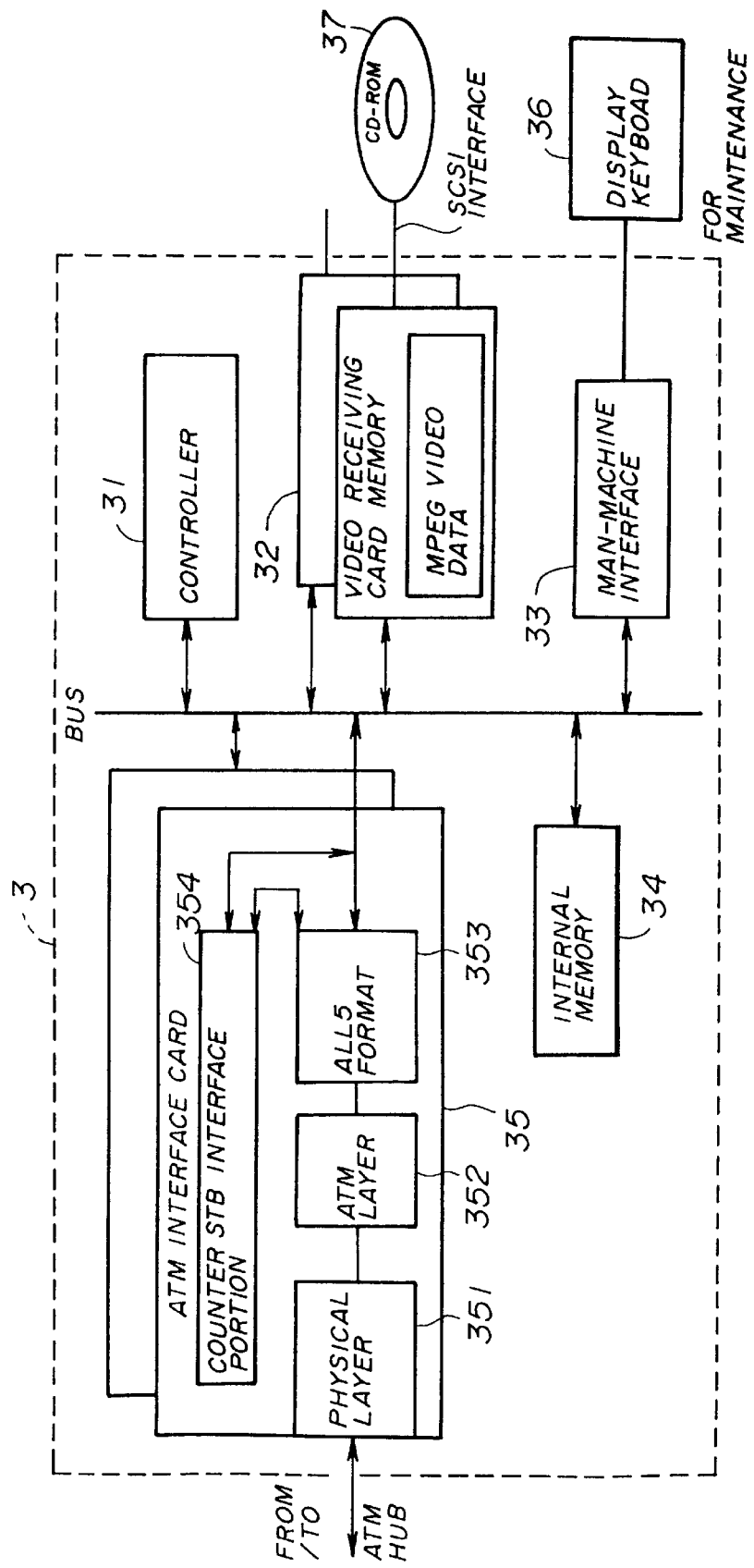
FIG. 6 is a block diagram illustrating a detailed structure of a video server in the VOD system.

The video server 3 is formed as shown in FIG. 6. Referring to FIG. 6, the video server 3 includes a controller 31, a video receiving card 32, a man-machine interface 33, an internal memory 34, an ATM interface card 35, an input/output unit 36 and a CD-ROM unit 37. The controller 31 controls the whole of the video server 3. The CD-ROM unit 37 stores MPEG video information of various video programs. The video receiving card 32 has a memory for storing MPEG video information. The video receiving card 32 receives the MPEG video information read out of the CD-ROM unit 37. The MPEG video information is temporarily stored in the memory of the video receiving card 32 and transmitted to a STB terminal. The input/output unit 36 includes a display device and a keyboard and is connected to the body of the video server 3 via the man-machine interface 33. The ATM interface card 35 includes a physical layer portion 351, an ATM layer portion 352, an ALL-5 format portion 353 and a counter STB interface portion 354. The video server 3 is connected to the ATM-HUB unit 2 via the ATM interface card 35. The video server 3 differs from that in the conventional system shown in FIG. 1 in that the signaling function (Q. 293.1) is not required.

Figure 7:
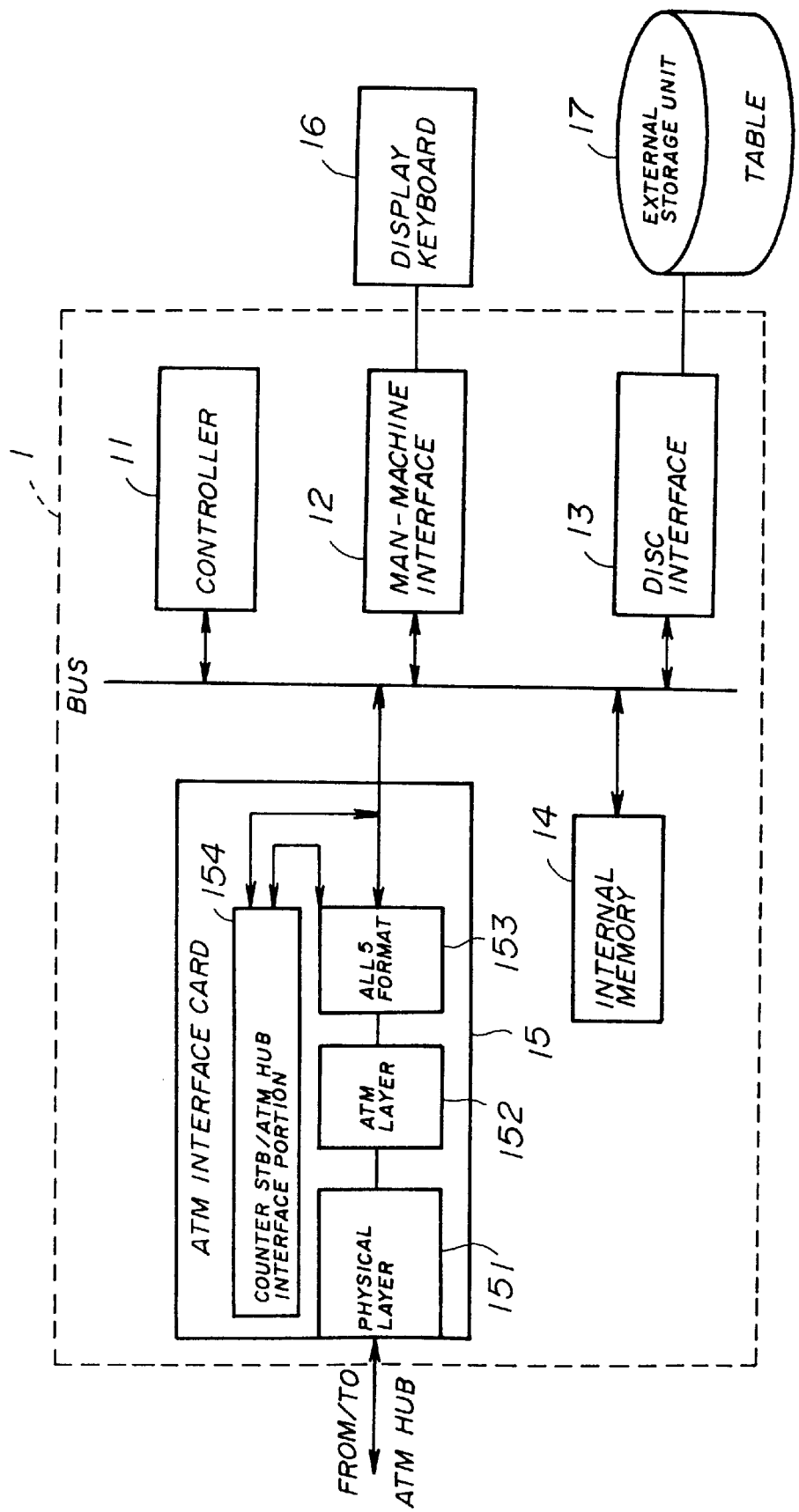
FIG. 7 is a block diagram illustrating a detailed structure of a path setting management server of the VOD system.

The path setting management server 1 is formed as shown in FIG. 7. Referring to FIG. 7, the path setting management server 1 includes a controller 11, a man-machine interface 12, a disc interface 13, an internal memory 14, an ATM interface card 15, an input/output unit 16 and an external storage unit 17. The controller 11 controls the whole of the path setting management server 1. The input/output unit 16 includes a display device and a keyboard and is connected to the body of the path setting management server 1 via the man-machine interface 12. The external storage unit 17 stores various tables and is connected to the body of the path setting management server 1 via the disc interface 13. The ATM interface card 15 includes a physical layer portion 151, an ATM layer portion 152, an ALL-5 format portion 153 and a counter STB/ATM-HUB interface portion 154. The path setting management server 1 is connected to the ATM-HUB unit 2 via the ATM interface card 15.

The external storage unit 17 of the path setting server 1 stores a terminal-HUB port+VPI/VCI reference table, a terminal state table, a program list table and a televising result table for each STB terminal.

The terminal-HUB port+VPI/VCI reference table is formed as shown in FIG. 14. When the STB terminal or the video server is added, changed or deleted, this table is updated. This table has items of "TERMINAL ID", "TYPE OF TERMINAL (STB/server)", "ATM-HUB PORT NUMBER (a shelf number, a card number and a circuitry number)", "VPI VALUE" and "CPI VALUE". Information of the respective items for each terminal is entered in this table.

The terminal state table is formed as shown in FIG. 15. When it is detected that the state of each terminal is changed, the contents of this table are updated. This table has items of "TERMINAL ID", "TYPE OF TERMINAL", "IDLE/BUSY INDICATION", "CONNECTING TERMINAL", "TELEVISING PROGRAM ID", "START TIME" and "EXPECTED TELEVISING PERIOD". Information of the respective items for each terminal is entered in this table.

The program list table is formed as shown in FIG. 16. When video programs are changed, the program list table is updated. This table has items of "TELEVISED PROGRAM ID", "TITLE", "DIRECTOR", "LEADING ACTOR/ACTRESS", "CONTENTS", "TELEVISING PERIOD" and "PRICE". Information of the respective items for each program is entered in this table.

Figure 17:
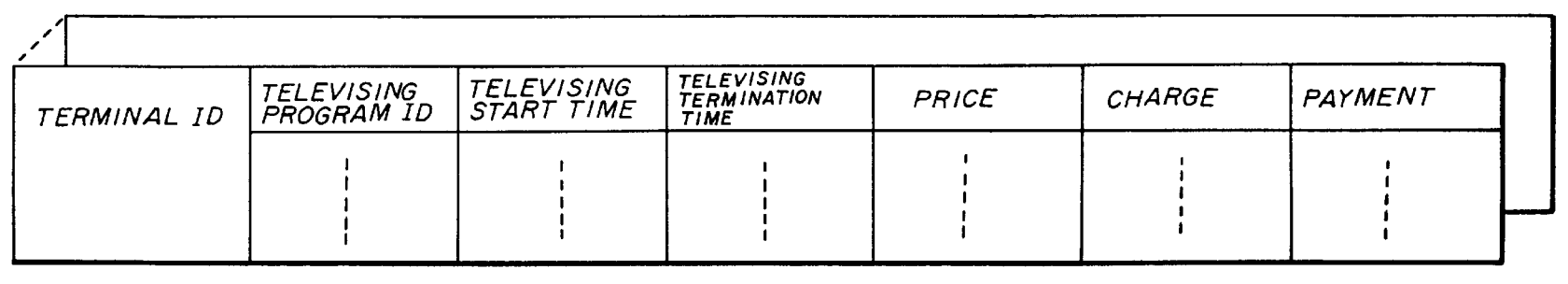

The televising result table for each terminal (STB) is formed as shown in FIG. 17. When a charging process, a payment process and televising of a program are completed, this table is updated. This table has items, corresponding to each terminal ID, of "TELEVISED PROGRAM ID", "TELEVISING START TIME", "TELEVISING TERMINATION TIME", "PRICE", "CHARGE" and "PAYMENT".

Figure 8:
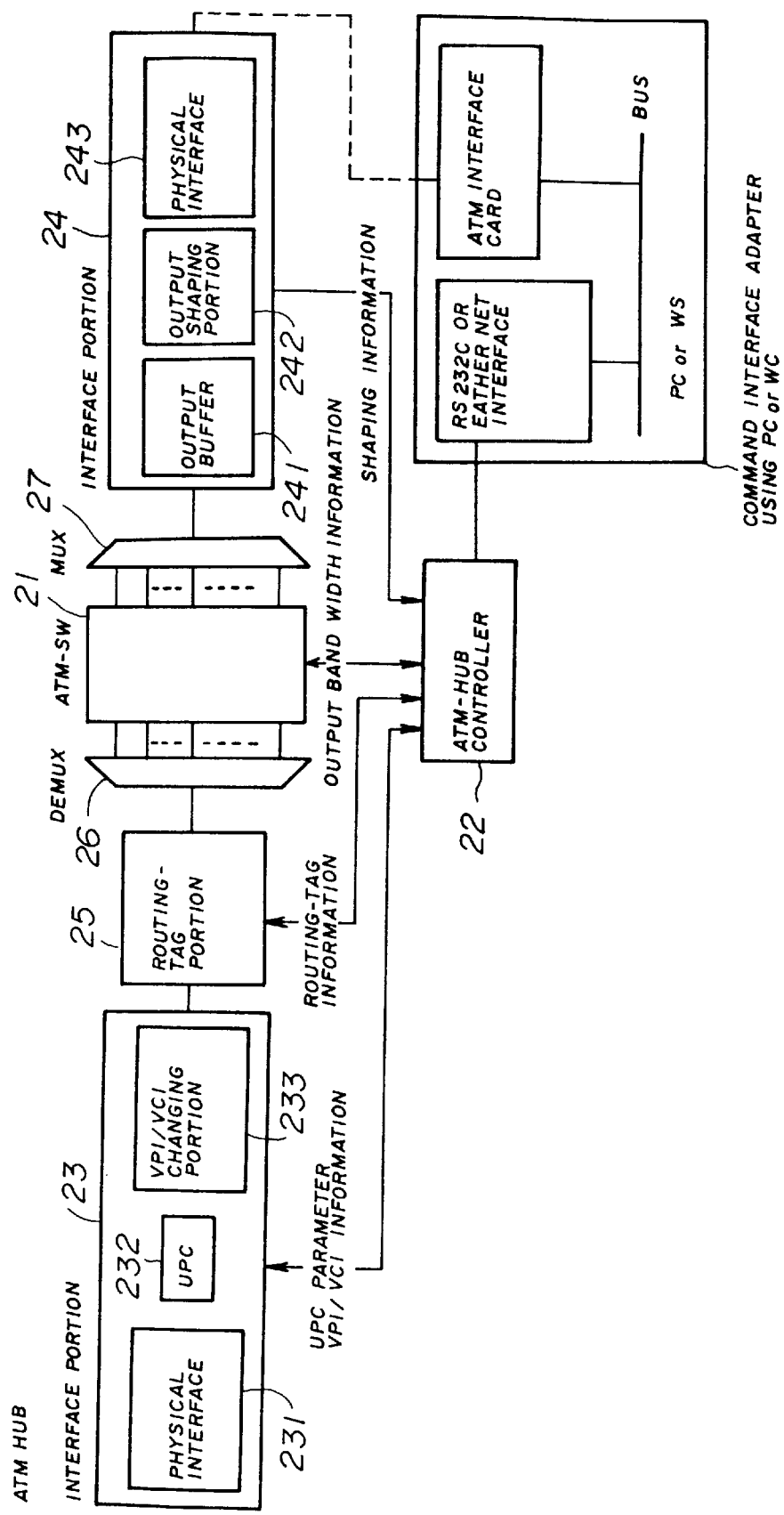
FIG. 8 is a block diagram illustrating a detailed structure of an ATM-HUB unit of the VOD system.

The ATM-HUB unit 2 is formed as shown in FIG. 8. Referring to FIG. 8, the ATM-HUB unit 2 includes an ATM switch circuit 21, an ATM-HUB controller 22, a receiving side interface portion 23, a transmission side interface portion 24, a routing-tag portion 25, a demultiplexer 26 and a multiplexer 27. FIG. 8 shows only a structure in which ATM cells flow from the left to the right. However, the ATM-HUB unit 2 also has a structure (symmetrical to the structure shown in FIG. 8) in which ATM cells flow from the right to the left. The structure in which the ATM cells flow from the right to the left is omitted from the FIG. 8. The respective interface portions 23 and 24 are connected to ATM paths of 150 Mbps/600 Mbps. In FIG. 8, although each of the interface portions 23 and 24 is provided with a single line on the input side and a single line on the output side, lines corresponding to a plurality of lines accommodated in the ATM-HUB unit 2 are provided in each of the interface portions as shown in FIG. 4.

The receiving side interface portion 23 includes a physical interface 231, a UPC portion 232 and a VPI/VCI changing portion 233. ATM cells from the ATM line are received by the receiving side interface portion 23. The routing-tag portion 25 adds a tag used for routing to each of the ATM cells. The demultiplexer 26 divides the multiplexed ATM cell. The ATM switch circuit 21 performs a switching operation for the ATM cells based on the PVC path setting manner. The multiplexer 27 multiplexes the ATM cells from the ATM switch 21. The transmission side interface portion 24 includes an output buffer 241, an output shaping portion 242 and a physical interface portion 243. The ATM cells are supplied from the transmission side interface portion 24 to the ATM line. Between the ATM-HUB controller 22 and the body of the ATM=HUB unit 2, UPC parameters, VPI/VCI information, routing-tag information, output bandwidth information and shaping information are transmitted.

In the example shown in FIG. 8, the Ethernet interface card which is used as the command interface adaptor is not included in the ATM-HUB unit 2. That is, the ATM interface card of 150 Mbps is mounted in a personal computer (PC) or a work station (WS) used as the command interface adapter. The line of 150 Mbps (OC3) from the transmission side interface 24 is received by the ATM interface card and is connected to the ATM-HUB controller 22 via the Ethernet interface or the RS232C interface of the personal computer (PC) or work station (WS).

Figure 9:
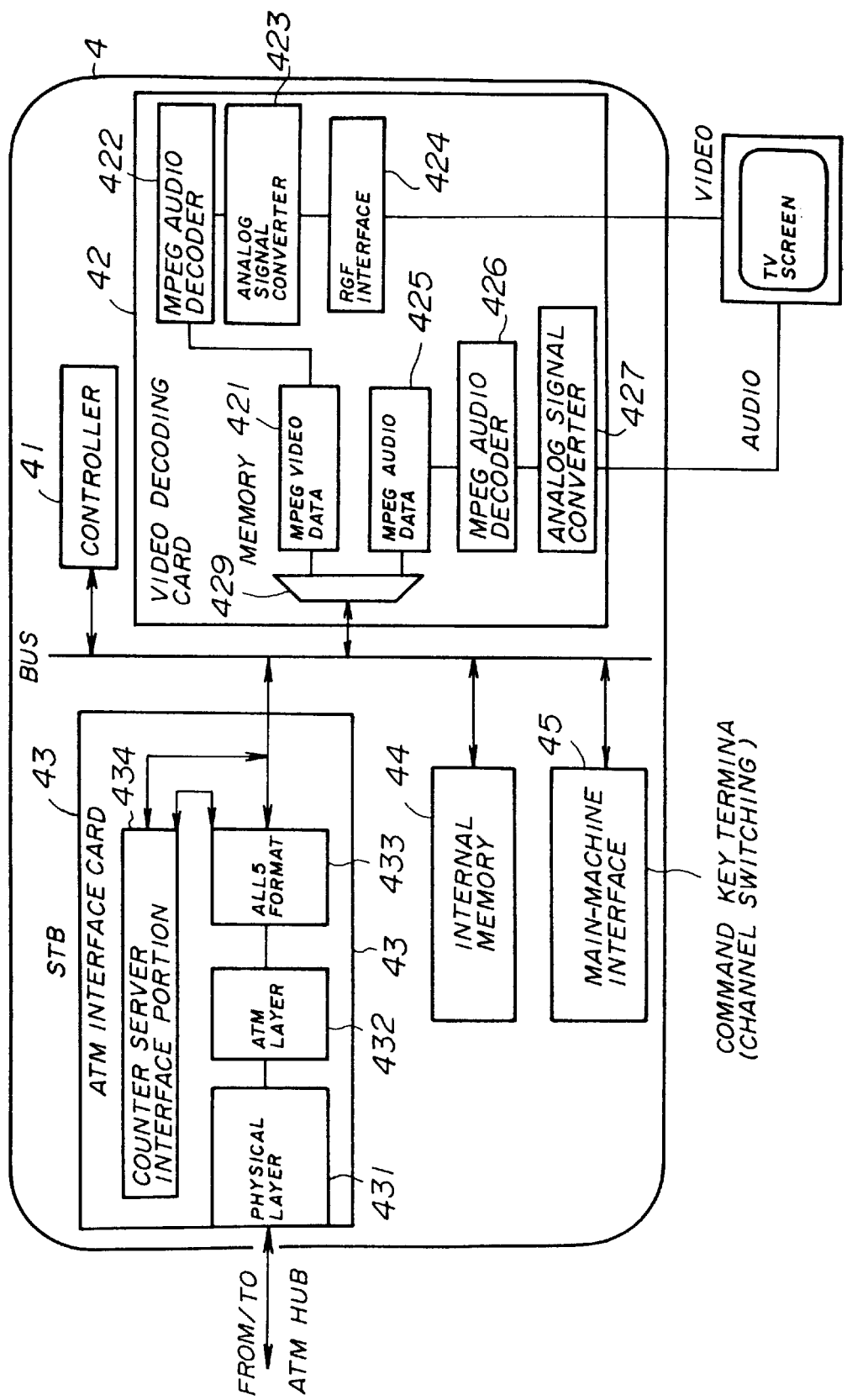
FIG. 9 is a block diagram illustrating a detailed structure of an STB terminal of the VOD system.

Each of the STB terminals 4 is formed as shown in FIG. 9. Referring to FIG. 9, a STB terminal includes a controller 41, a video decoding card 42, an ATM interface card 43, an internal memory 44 and a man-machine interface 45. The controller 41 controls the whole of the STB terminal. The video decoding card 42 decodes received MPEG video information and transmits the decoded MPEG video information to the television set of the subscriber. The video decoding card 42 includes a distributor 429, an MPEG video data memory 421, an MPEG video decoder 422, a video analog signal converter 423, an RGB interface 424, an MPEG audio data memory 425, an MPEG audio decoder 426 and an audio analog signal converter 427. The ATM interface card 43 transmits and receives data to and from the path setting management server 1 and the video server 3 via the access system 6 and the ATM-HUB unit 2. The ATM interface card 43 includes a physical layer portion 431, an ATM layer portion 432, an ALL-5 format portion 433 and a counter server interface portion 434. The man-machine interface 45 is used to input commands, such as a channel changing command from a key command terminal and other types of commands, to the body of the STB terminal. The STB terminal differs from that in the conventional system shown in FIG. 1 in that the signaling function (Q. 293.1) is not required.

A description will now be given of the contents of ATM cell signals transmitted in the VOD system.

Each of the signals transmitted through lines set between the respective STB terminals 4 and the path setting management server 1 has the contents as shown in FIGS. 10A and 10B.

The LAPB (Link Access Procedure Balanced) protocol which has been guaranteed as the control protocol may be used for the payload data of the ATM cell. A flag-sequence function, a frame-checking-sequence function (FCS), a command/response procedure and a flow control utilizing N(S) and N (R) are used as the LAPB protocol. The cell format, as shown in FIG. 10A, is formed of items of "frame signal", "address information", "control information", "information element", "FCS" and "frame signal".

The item of "information element" includes, as shown in FIG. 10B, elements from the STB terminal to the path setting management server 1, such as a video STB terminal ID, a video-request/program-display-request, a request video channel and a video interruption request, and elements from the path setting management server 1 to the STB terminal, such as a video STB terminal ID, a request video channel, permission/denial information, idle/busy information of a required channel, a waiting time in a busy state, televising start/disconnection (reason) information, and a program list (channel number/title/ director; actor; actress/ contents/televising period).

Figure 12:
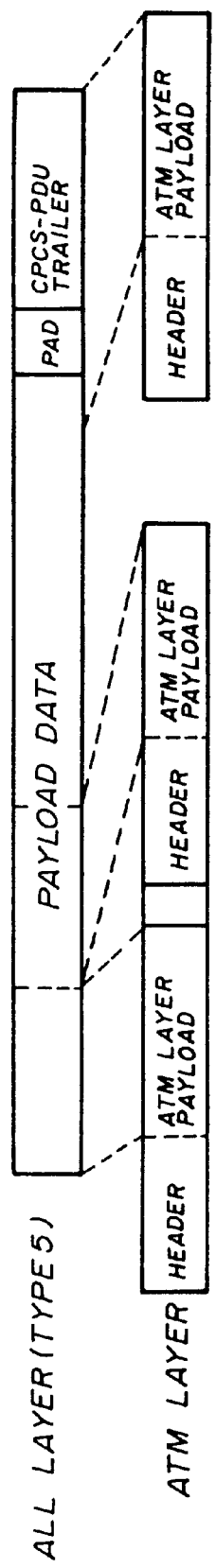
FIG. 12 is a diagram illustrating a data structure in a case where a type-5 of an ALL layer is utilized.

A data structure in a case where the type-5 ALL layer (the low order layer) is utilized is shown in FIG. 12.

The contents of signals transmitted through the line between the path setting management server 1 and the ATM-HUB unit 2 are shown in FIG. 11. In a case where the ATM-HUB unit 2 and the path setting management are connected via the WS/PC (Work station/Personal computer), the data structure of the low order layer is the same as that of the low order layer set between the path setting management server 1 and the STB terminal. However, the contents of the item of "information element" differ from each other. The data structure set between the path setting management server 1 and the ATM-HUB unit 2 includes the item of "information element" having the contents as shown in FIG. 11.

That is, the elements from the path setting management server 1 to the ATM-HUB unit 2 include line control request/path setting state confirmation and connection request/disconnection request. The connection request/disconnection request is formed of the VPCI/VCI value (source), the ATM-HUB port number (source), VPCI/VCI value (destination), the ATM-HUB port number (destination), and $Q_oS$ parameter/required band. The elements from the ATM-HUB unit 2 to the path setting management server 1 include connection completion/denial (adding reasons) information, a path connection state list, line disconnection information (disconnection port/reasons) and body (ATM-HUB) restart information. The path connection state list is formed of the VPCI/VCI (source), the ATM-HUB port number (source), VPCI/VCI (destination) and the ATM-HUB port number (destination).

Figure 13:
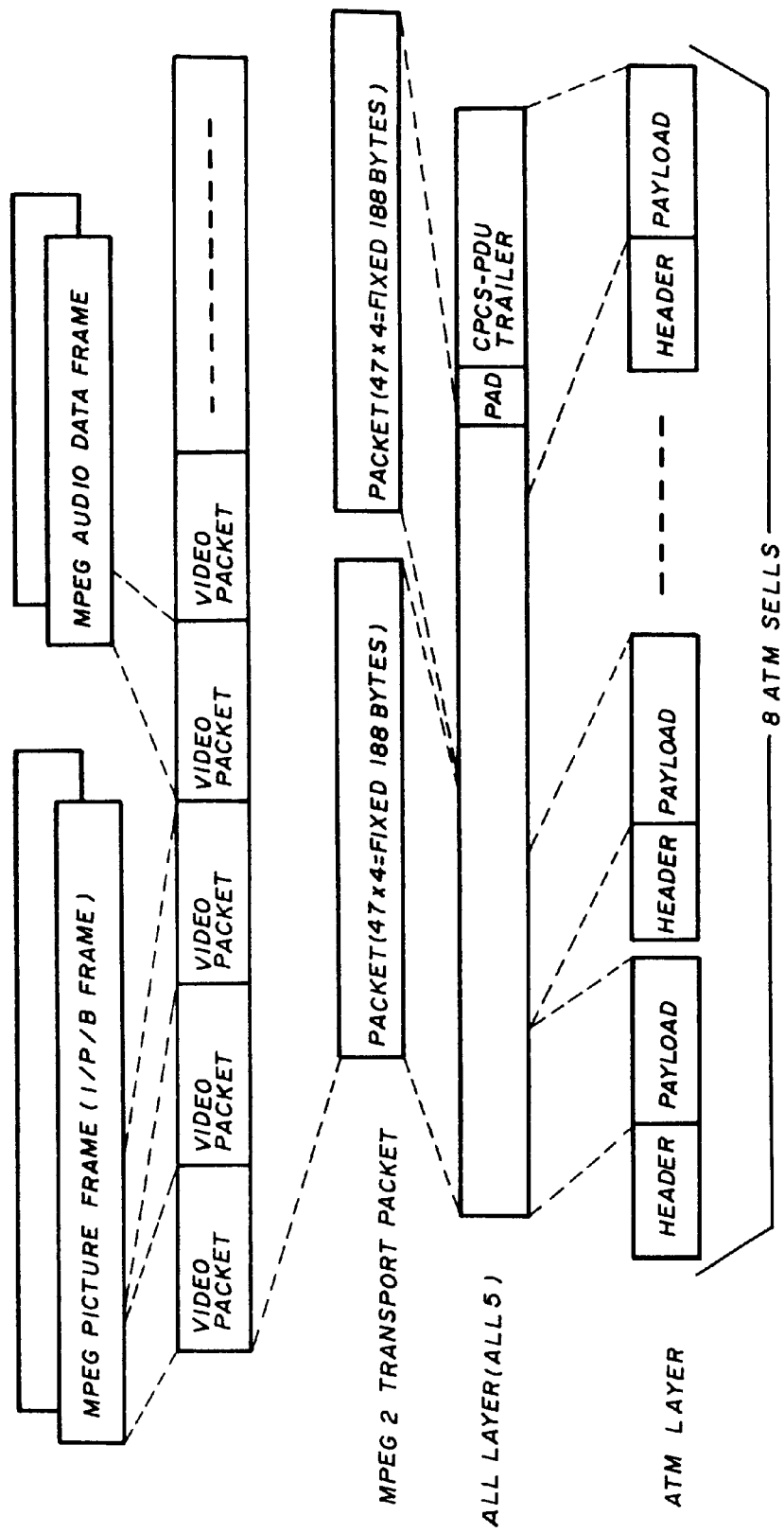
FIG. 13 is a diagram illustrating a cell format of picture information.

The format of the video information transmitted from the video server 3 to the STB terminal 4 is formed as shown in FIG. 13. The video/audio information is converted into compressed data in accordance with the MPEG compression manner, and the compressed data (the MPEG data) is transmitted. The MPEG data is divided into ATM cells in a format provided by the DAVIC (Digital Audio Visual Council).

Hereinafter, a description will be given with reference to FIGS. 18–21, of operations of the VOD system.

Figure 18:
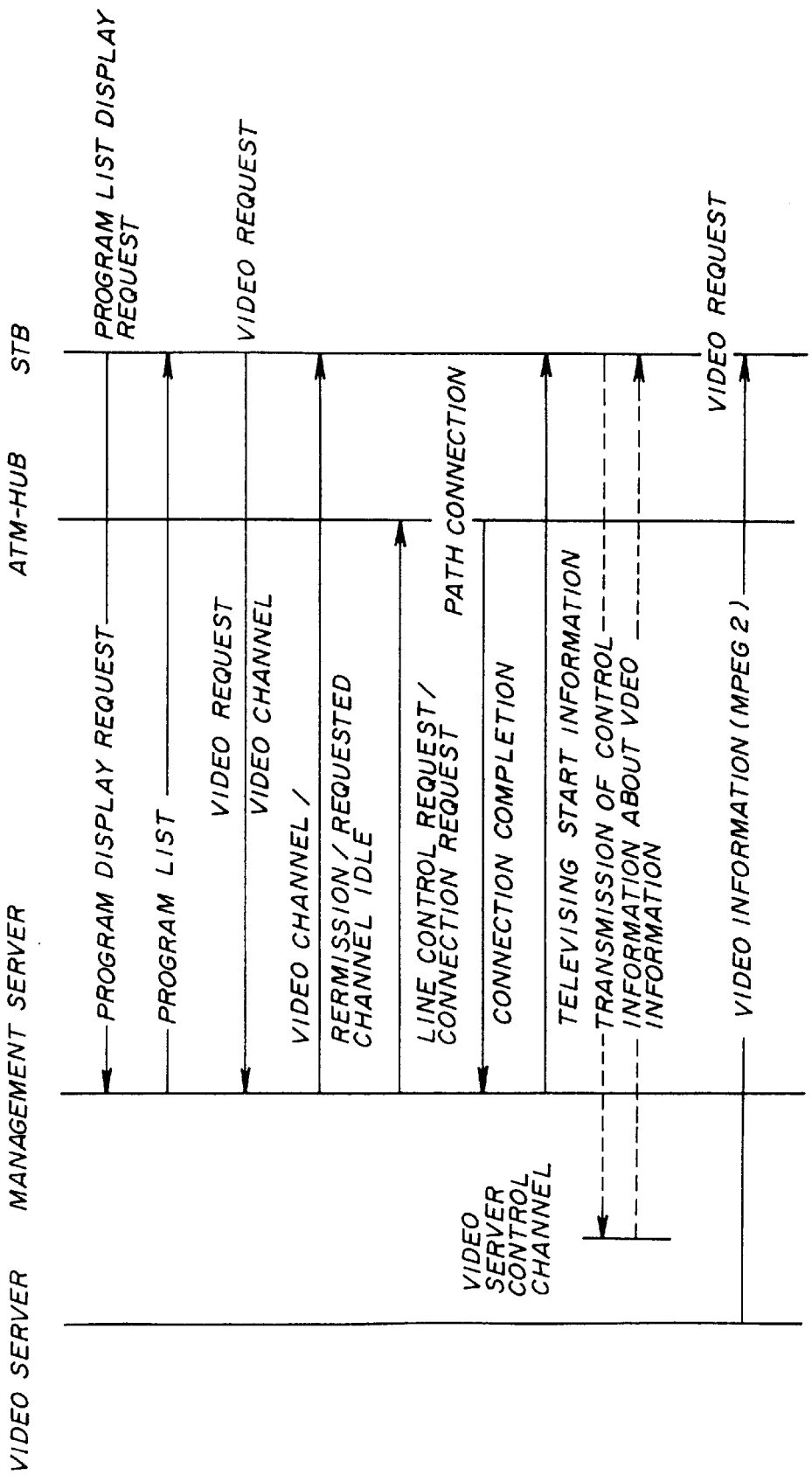
FIG. 18 is a sequence diagram illustrating a line control procedure (video selection/transmission procedure-normal connection)

A video selecting/transmission procedure in a normal case is shown in FIG. 18.

Figure 21:
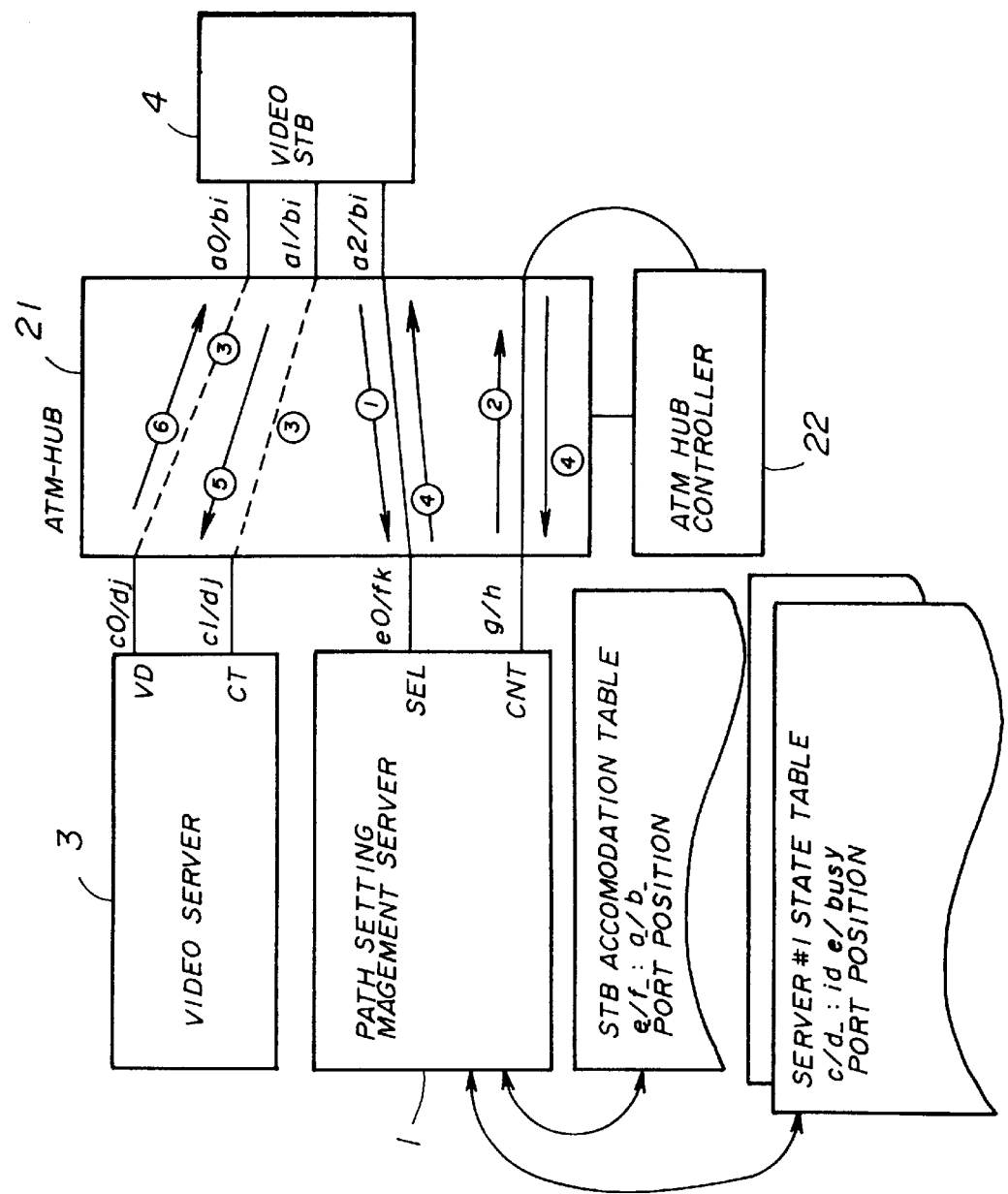
FIG. 21 is a diagram illustrating a procedure for connecting the VOD in the ATM-HUB.

The following PROCEDURES are executed in the ATM-HUB unit 21 of the VOD system in the order as shown in FIG. 21.

PROCEDURE ① in FIG. 21

To request transmission of video information, first, the STB terminal 4 transmits a program list display request to the path setting management server 1. When receiving the program list display request, the path setting management server 1 transmits a program list based on the program list table as shown in FIG. 16 to the STB terminal 4. In the STB terminal 4, the program list is displayed by the television set. The subscriber selects a program which the subscriber wants to watch from the program list displayed by the television set. The STB terminal 4 then transmits a video transmission request for the selected program identified by the video televising number #1 to the path setting management server 1.

The path setting management server 1 determines, based on the receive VPI/VCI, from which STB terminal the request has been transmitted. The path setting management server 1 detects port positions on the ATM-HUB unit 2 and the VPI/VCI values about the VD channels and the CT channels for the STB terminal 4. As described with reference to FIG. 14, the path setting management server 1 has the reference table used to detect the port positions on the ATM-HUB unit 2 and the VPI/VCI values (=a/b) of the VD/CD channels for the STB terminal 4 based on the VPI/VCI values (=e/f) of the ATM cell received from the STB terminal 4.

Further, the path setting management server 1 selects a video server corresponding to the received video televising number #1 and determines whether there are free channels in the video server. The path setting management server 1 manages, using the terminal state recognition table shown in FIG. 15, whether the channels of the video servers are in the free state.

If there are channels in the free state, the path setting management server 1 detects the port positions on the video server side of the ATM-HUB unit 2 and the VPI/VCI values (=c/d) of the VC/CT channels. The path setting management server 1 then informs the STB terminals that the request is allowed since the required video channels are in the free state.

PROCEDURE ② in FIG. 21

Next, the path setting management server 1 generates connection data (path setting command information) based on the port numbers of the video server side and the STB terminal side and the VPI/VCI values. The path setting management server 1 then transmits to the ATM-HUB controller 22 the connection data in the command format in the normal PVC setting function. At this time, the terminal (server) state recognition table is updated so that the channels are in the busy state.

PROCEDURE ③ in FIG. 21

When the ATM-HUB controller 22 receives the path setting commands, the ATM-HUB controller 22 causes the switch circuit 21 to set the normal PVC path and performs the connection process for the VD/CT channels between the STB terminal 4 and the video server 3.

PROCEDURE ④ in FIG. 21

After the connection process, the ATM-HUB controller 22 informs the path setting management sever 1 of the setting completion. In general, the ATM-HUB controller informs the path setting management server 1 using the message format for the PVC setting. Further, in response to the setting completion information, the path setting management server 1 transmits to the STB terminal 4 the televising start information (a communication allowable signal or path setting completion information) in the video server 3.

PROCEDURE ⑤ in FIG. 21

When the STB terminal 4 receives the televising start information, the STB terminal 4 transmits a televising request for a required program to the video server 3. Control information for televising the video program is transmitted between the STB terminal 4 and the video server 3.

PROCEDURE ⑥ in FIG. 21

In the video server 3, when the request signal is received from the STB terminal 4, the video information of the requested video televising number #1 is transmitted through a corresponding VD channel.

Figure 19:
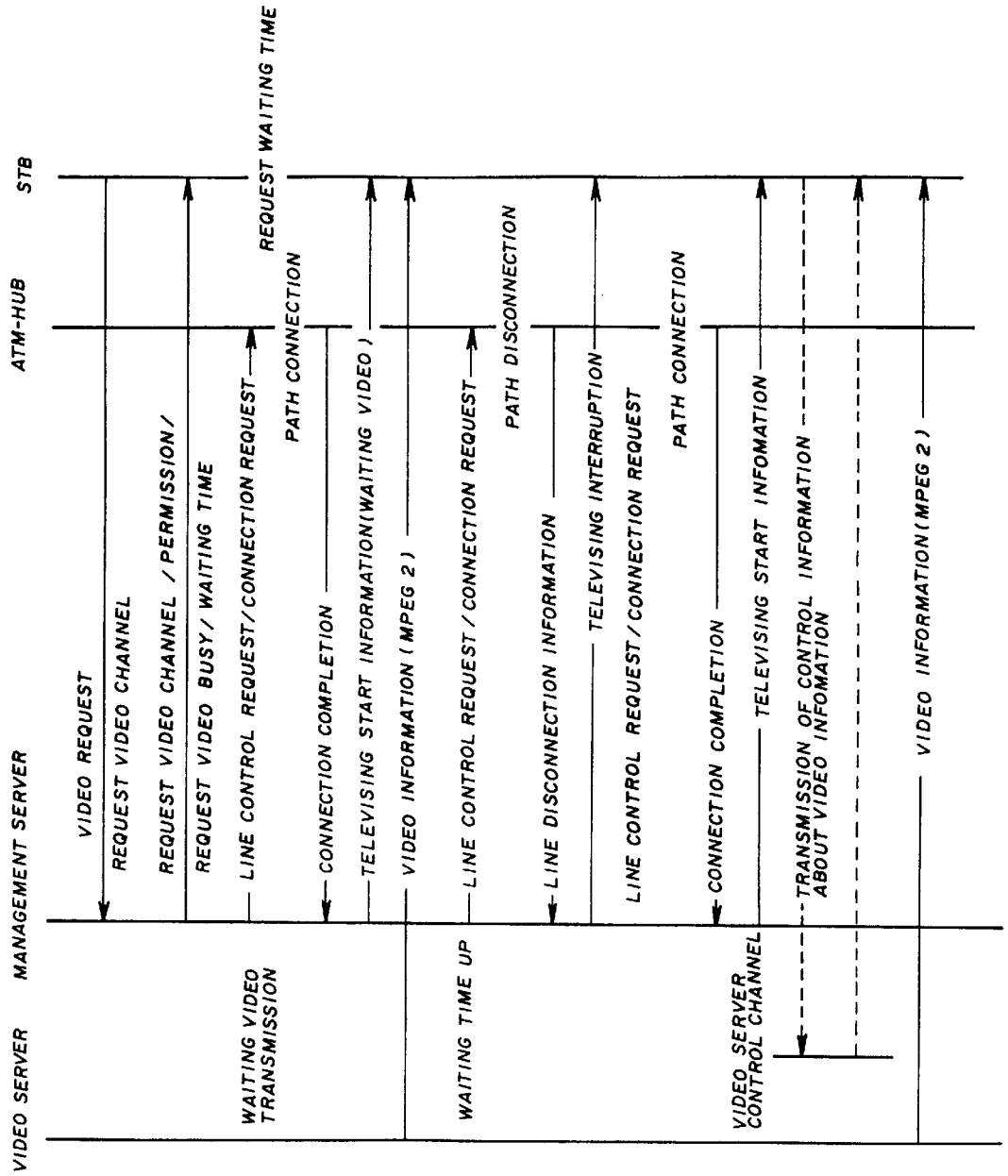
FIG. 19 is a sequence diagram illustrating a line control procedure (video selection/transmission procedure-busy connection)

In the above PROCEDURE ① in FIG. 21, if there is no free channel, the process is performed in accordance with procedures as shown in FIG. 19. That is, the path setting management server 1 informs the STB terminals of the busy state (including a waiting time). In this case, the televising period is calculated based on the difference between a setting time of the busy channel and the present time. The minimum value of the remaining televising period is calculated based on the televising period. The path setting management server 1 informs the STB terminal 4 of the minimum waiting time corresponding to the minimum value of the remaining televising period. The subscriber of the STB terminal 4 determines, based on the busy state, whether the video transmission request should be connected or released. If the video transmission request is not released on the STB terminal side, the STB terminal 4 is in the waiting state until a free channel is formed. When the STB terminal 4 is in the waiting state, waiting video information is transmitted to the STB terminal 4. The waiting video information may be video information of a video program which has been televised.

A video transmission process is performed in the same procedure as in the case described above. That is, the path setting management server 1 requests the ATM-HUB controller 22 to connect the line of the video server 3 which is transmitting the waiting video information and the STB terminal 4. When a path is set in the ATM-HUB unit 2 in response to the request, the ATM-HUB controller 22 informs the path setting management server 1 of the completion of the connection. The path setting management server 1 then informs the STB terminal of the televising start of the waiting video program and the video server 3 transmits the video information of the waiting video program to the STB terminal 4.

When a free channel is provided so that a waiting time is over, the path setting management server 1 requests the ATM-HUB controller 22 to disconnect the line between the video server 3 which is supplying the waiting video program and the STB terminal. In response to this request, the ATM-HUB controller 22 disconnects the path and informs the path setting management server 1 that the path between the video server 3 and the STB terminal 4 has been disconnected. In response to this information, the path setting management server 1 informs the STB terminal 4 of the interruption of the waiting video program. The path setting management server 1 then requests the ATM-HUB controller 22 to connect the line between the video server 3 which should supply the requested video program (the video televising number #1) and the STB terminal 4. After this, the process is performed in accordance with the control procedure described with reference to FIG. 18.

Figure 20:
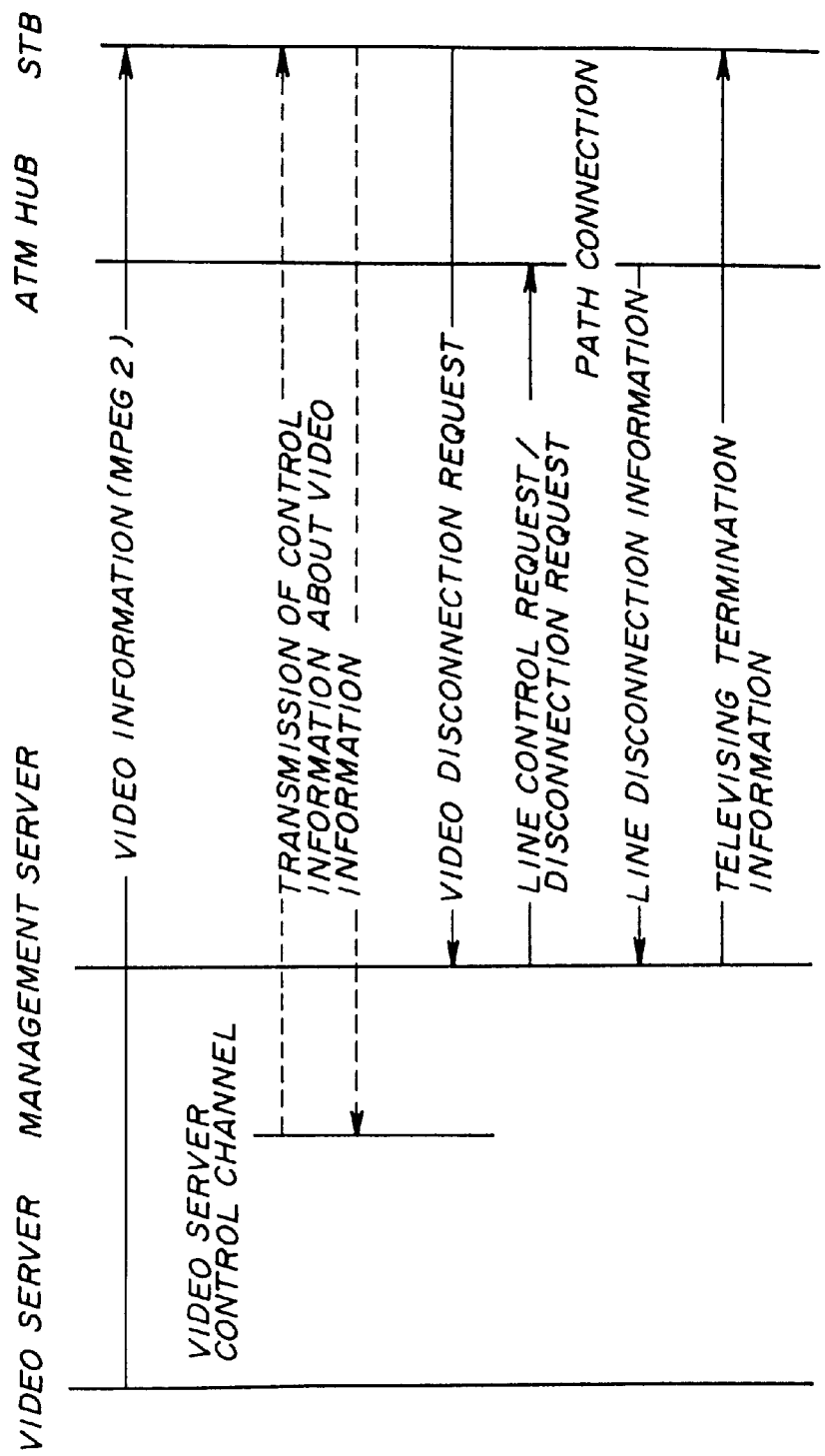
FIG. 20 is a sequence diagram illustrating a line control procedure (disconnection of a video line)

After termination of televising the video program, the process is performed in accordance with the control procedure as shown in FIG. 20. When the video program is completely televised and when the video program is interrupted in the STB terminal 4, the televising of the video program is terminated. In both cases, the STB terminal 4 transmits a termination request to the video server 3 via the CT channel. At this time, the STB terminal 4 transmits a video disconnection request to the path setting management server 1 via the SEL channel. The path setting management server 1 supplies the line control request/disconnection request to the ATM-HUB controller 22 in the same manner as in the case where the path is set. In response to this request, the ATM-HUB controller 22 disconnects the PVC path which was set by the switch circuit 21 and informs the path setting management server 1 of the line disconnection. In response to this information, the path setting management server 1 informs the STB terminal 4 of the disconnection of televising the video program.

The present invention is not limited to the aforementioned embodiments, and other variations and modifications may be made without departing from the scope of the claimed invention.

What is claimed is:

1. An on-demand system controlling on-demand services between a media server and subscriber terminals, said system comprising:

an ATM-HUB unit which performs a path setting operation in accordance with a PVC (Permanent Virtual Connection) function; and a path setting management server, wherein said ATM-HUB unit provides previously set paths between said subscriber terminals and said path setting management server and between a controller of said ATM-HUB unit and said path setting management server in accordance with the PVC function when setting environments of said system, a subscriber terminal supplying a media transmission request to said path setting management server via the path set between said subscriber terminal and said path setting management server, and wherein said path setting management server requesting said controller of said ATM-HUB unit to set a path between said subscriber terminal and said media server via the path set between said path setting management server and said controller of said ATM-HUB unit in response to the media transmission request from said subscriber terminal, and wherein said ATM-HUB unit sets a path between said subscriber terminal and said media server in accordance with the PVC function, based on an instruction from said controller.

2. The on-demand system as claimed in claim 1, wherein said path setting management server is accommodated by a user port of said ATM-HUB unit, said user port being connected to said controller via a command interface adapter so that data is transmitted between said path setting management server and said controller of said ATM-HUB unit, said path setting management server supplying a path setting request to said controller of said ATM-HUB unit in a command format used to set a path in accordance with the general PVC function.

3. The on-demand system as claimed in claim 2, wherein said command interface adapter is an Ethernet adapter provided in said ATM-HUB unit, so that data is transmitted between said path setting management server and said controller of said ATM-HUB unit via said Ethernet adapter and an Ethernet.

4. The on-demand system as claimed in claim 2, wherein said command interface adapter is an ATM interface card which interfaces between an ATM line and an Ethernet, said ATM interface card being provided outside said ATM-HUB unit and connected to a user port of said ATM-HUB unit, so that data is transmitted between said path setting management server and said controller of said ATM-HUB unit via said ATM interface card and the Ethernet.

5. The on-demand system as claimed in claim 1 further comprising a server system provided between said subscriber terminals and said ATM-HUB unit, said server system concentrating low speed lines from said subscriber lines and relaying the low speed lines to a high speed line, said server system having a VPI/VCI conversion function to discriminate said subscriber terminals when the low speed lines is relayed to the high speed line.

6. The on-demand system as claimed in claim 1, wherein said path setting management server has a unit for extracting a port number and a VPI/VCI value about a channel between said subscriber terminal and said media server from VPI/VCI values in the media transmission request from said subscriber terminal.

7. The on-demand system as claimed in claim 1, wherein said path setting management server has a system for selecting said media server and a free channel based on the media request information, managing states of channels of said media server, and extracting a port number on said ATM-HUB unit and VPI/VCI value for the free channel.

8. The on-demand system as claimed in claim 6, wherein said path setting management server has a system for forming path setting command information based on the port position and the VPI/VCI value in response to the media transmission request from said subscriber unit, outputting a path setting request to said controller of said ATM-HUB unit in a command format used to set a path in accordance with the general PVC function.

9. The on-demand system as claimed in claim 7, wherein said path setting management server has a system for forming path setting command information based on the port position and the VPI/VCI value in response to the media transmission request from said subscriber unit, outputting a path setting request to said controller of said ATM-HUB unit in a command format used to set a path in accordance with the general PVC function.

10. The on-demand system as claimed in claim 1, wherein said controller of said ATM-HUB unit informs, using a message format used to set a path in accordance with the general PVC function, said path setting management that a path is set in said ATM-HUB unit, said path setting management server recognizing, based on the information that the path has been completely set, and relaying path setting completion information to said subscriber.

11. The on-demand system as claimed in claim 1, wherein after a media transmission path and a control signal path are set between said subscriber and said media server, said media server recognizes the media transmission request from said subscriber terminal via the control signal channel and the media transmission channel corresponding to the control signal channel, said media server transmitting the media through said media transmission channel.

12. The on-demand system as claimed in claim 1, wherein when a free channel unavailable for said video server which receives the media transmission request, said path setting management server requests said video server to be temporarily connected to said subscriber terminal so that a waiting media information is supplied to said subscriber terminal.

13. The on-demand system as claimed in claim 1, wherein when a free channel is for said video server which receives the media transmission request, said path setting management server calculates a minimum value of a waiting time for which said subscriber terminal should wait for receiving the media and forms said subscriber terminal of the minimum value of the waiting time.

* * * * *